INVENTORS
PAUL VAN SITTERT
LLOYD G. SPETH
BY
Kwis, Hudson, Boughton & Williams
ATTORNEYS

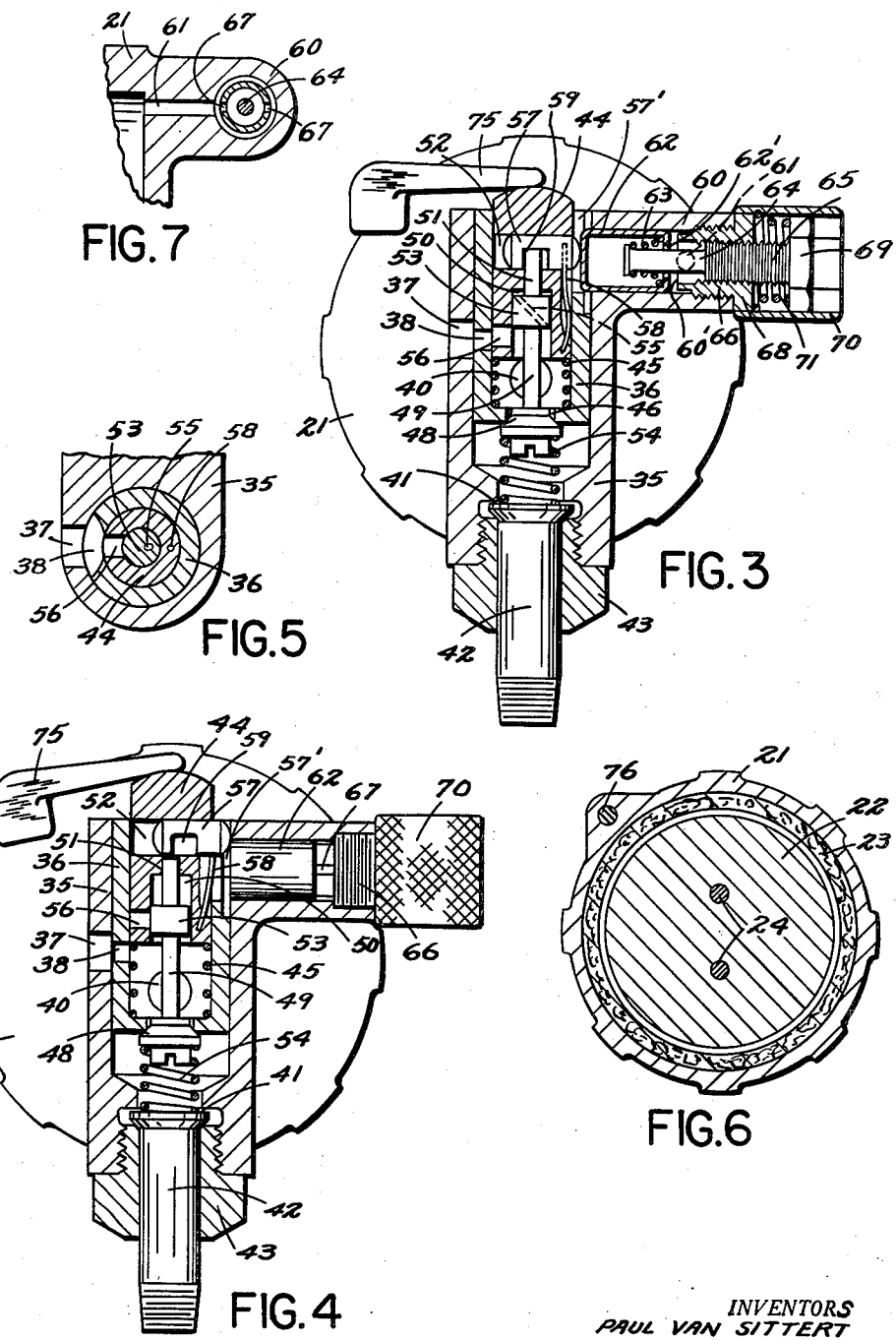

Patented May 8, 1951

2,551,916

UNITED STATES PATENT OFFICE 2,551,916

PRESSURE FLUID CONTROLLING DEVICE

Paul Van Sittert, Shaker Heights, and Lloyd G. Speth, East Cleveland, Ohio, assignors, by mesne assignments, to Reed Roller Bit Company, Houston, Tex., a corporation of Texas Continuation of application Serial No. 393,036, May 12, 1941. This application May 3, 1945, Serial No. 591,642

7 Claims. (Cl. 121—11)

This invention relates to improvements in fluid operated tools, and has reference particularly to tools of this character which are operated by compressed air. As herein illustrated the invention is applied to a rivet squeezer. This application is a continuation of our copending application Serial No. 393,036, filed May 12, 1941, entitled "Portable Tool," now abandoned.

One of the objects of the invention is the provision of means for limiting the pressure which may be exerted by the tool in doing useful work, for example in forming the head of a rivet, in order that for a given job with a given setting of the tool the effect of the repeated operations of the tool may be uniform.

Another object is the provision of simple, readily adjustable control mechanism for accomplishing the purpose of the invention.

Another object of the invention is the provision of a novel and improved, manually operable, portable fluid pressure operated tool, for example, a rivet squeezer, comprising means for limiting the force or pressure which may be exerted by the tool in such a manner that the effect of repeated operations of the tool may be uniform.

Other objects and features of novelty will appear from the following description of the preferred embodiment of the invention which, for the purposes of the present application, we have illustrated in the accompanying drawing, in which Fig. 1 is a longitudinal sectional view of a compressed air rivet squeezer embodying the invention;

Fig. 3 is a similar view showing the control parts in the positions which they occupy when the automatic stop means has functioned;

Fig. 4 is still another view of a similar character, showing the control mechanism in the idle position;

Fig. 5 is a detail sectional view taken substantially on the line 5—5 of Fig. 2;

Fig. 6 is a transverse sectional view taken on the line 6—6 of Fig. 1; and

Fig. 7 is a detail sectional view taken substantially on the line 7—7 of Fig. 2.

Figure 1:
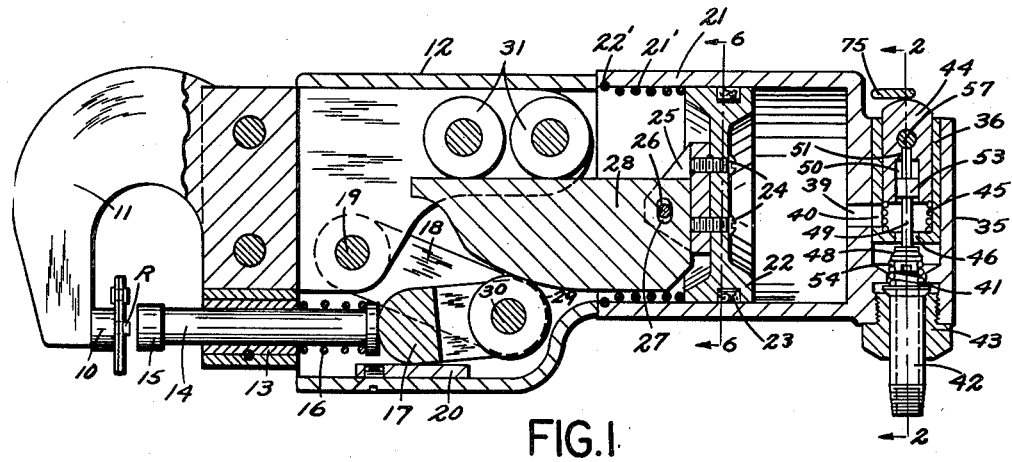

The embodiment of the invention illustrated in the drawing has to do with a rivet squeezer comprising an anvil 10 carried by an anvil arm 11 which is rigidly connected with the barrel or body 12 of the tool. In this body there is mounted a bushing 13 in which is operatively supported a plunger 14 having a head 15 which is adapted to engage and upset a rivet R positioned against the anvil 10. A coil spring 16 tends to retract the plunger 14 and maintain its rear end in engagement with a driver 17 that is pivotally connected with the free end of an arm 18 which swings about a pivot 19 carried by the body of the tool. The forward extremity of the driver 17 presses against the rear end of the plunger 14, and on one side near its forward extremity it bears upon a hardened plate 20. The two elements 17 and 18 together constitute in effect a toggle joint.

Attached to and forming in effect a part of the body 12 of the tool is a cylinder 21 in which slides a piston 22 provided with a packing ring 23. To the forward side of the piston there is fastened, by means of screws 24 or the like, a bracket 25 with a pair of separate plates in which is mounted a pin 26 that is received by a slot 27 in the rear part of a forwardly extending plate or block 28, the bottom surface of which is cam-shaped for engagement with an anti-friction roller 29 carried upon the pivotal connection 30 between the toggle elements 17 and 18. The straight upper side of this plate has bearing against a pair of rollers 31 in the body of the tool. Obviously, as the piston moves forward from its rearmost position, the roller 29 will be cammed downwardly, causing the driver 17 to travel forward, thereby moving the plunger 14 forward to press against the rivet. When the rivet has been headed and the pressure behind the piston 22 has been relieved the piston with the plate 28 is again moved rearwardly by a spring 21' having its front end anchored in the corresponding end of the cylinder 21 as at 22'.

Formed integral with the closed end of the cylinder 21 there is a substantially cylindrical boss 35 in which is fixedly mounted a sleeve 36. The boss 35 and the sleeve 36 form a chamber within which certain of the control parts are located and have registering side openings 37 and 38 respectively, together forming an exhaust port or passage communicating with the aforementioned chamber and atmosphere. These same elements also have registering openings 39 and 40 which together form a connection or outlet passage between the chamber in which the valve mechanism is located and the interior of cylinder 21. Boss 35 has an internal downwardly facing ledge 41 serving as a rest for the flared end of a nipple 42 rotatable within a hollow nut 43 threaded into the lower extremity of the boss 35.

A valve operating plunger 44 is mounted to slide in sleeve 36, being urged to the position of Fig. 4 by a coil spring 45 which bears against the low end of the plunger 44 and against an internal abutment on the lower end of sleeve 36. In the lower end of this sleeve there is a central opening 46 constituting an inlet port, this opening having its external marginal edge forming a valve seat for an inlet valve member 48 carried at the lower extremity of a valve stem 49 which extends upwardly through the port 46, through axial bores 50 and 51 in the plunger 44, and at times into a transverse bore 52 also in the plunger. Intermediate its ends the stem 49 is provided with an enlargement 53 which takes bearing against the walls of bore 50. The valve piece 48 with its stem 49 and enlargement 53 is urged upwardly by a coil spring 54. Through the enlargement 53 there is a small bleed passage 55 the function of which is to prevent the building up of pressure above the enlargement 53, which would tend to interfere with the movement of the valve stem in the upward direction. In communication at times with the axial bore 50 in the plunger there is a passage 56 which may function to open the exhaust port 38.

Figure 2:
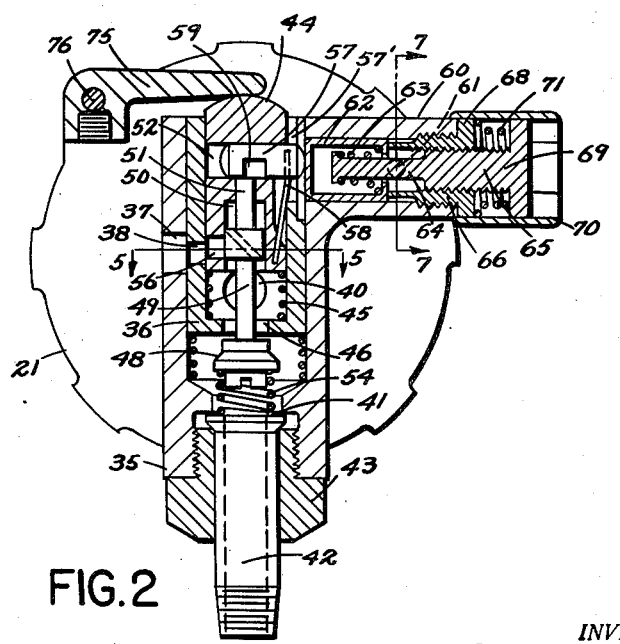
Fig. 2 is a cross-sectional view taken substantially on the line 2—2 of Fig. 1 on a somewhat larger scale, showing the control valve mechanism in the position it occupies on the work stroke.

In the transverse passage 52 there is mounted a pellet 57 which is urged towards the position of Figs. 2 and 4 by a leaf spring 58, the lower end of which is set into a hole in the plunger 44 while its upper end is set into a hole in the pellet. When the pellet is in the position illustrated in these two figures the relative positions of the two elements 44 and 49 are maintained as shown. One end of the pellet 57 projects through a vertical slot 57' in the sleeve 36, so that it may move with the plunger 44 while in its projecting position. The pellet 57 has a socket 59 therein which is adapted to receive the upper extremity of valve stem 49, as illustrated in Fig. 3.

Extending laterally from the upper end of valve boss 35 there is a substantially cylindrical projection 60 having a bore 60' extending therethrough into the boss 35. The bore 60' is also in communication with the interior of the cylinder 21 through a passage 61. In the bore 60' there is a hollow plunger 62, which may be a sheet metal shell the closed extremity of which is adapted to bear against the pellet 57. A coil spring 63 tends to move this plunger outwardly to the position of Figs. 2 and 4, the spring bearing against the head of an adjusting pin 64 and against an internal flange 62' on the open end of the plunger. The pin 64 has a threaded portion 65 which is screwed into a stationary bushing 66 that is in turn threaded into the cylinder 60 and has a constricted inner end which serves as a stop for the plunger 62 and is slotted as indicated at 67 in Figs. 4 and 7 in order to facilitate the flow of air into the bore 60' from the passage 61. Sleeve 66 has a hex head 68 and pin 64 has a hex head 69. 70 is a sleeve with hexagonal internal surfaces which are adapted to fit the hex heads 68 and 69. A coil spring 71 has its inner end welded or otherwise anchored to the sleeve 70 and has its outer end bearing against the hex head 69. The operator may grasp the sleeve 70, which is preferably knurled on its outer surface, pull it out sufficiently to clear the hex head 68, and then turn it to move pin 64 for the purpose of adjusting the tension of spring 63, after which he may let the spring 71 return the sleeve into locking engagement with the hex head 68. The adjustment is thereby maintained against accidental movement.

If the plunger 44 were conveniently positioned for the purpose it could be depressed directly by the thumb of the operator. But when the operator is grasping the tool and holding it in proper position with respect to the work, his thumb is out of range of the plunger 44 and his other hand may be occupied with holding the work. Accordingly we provide an actuating arm 75 which bears at its free end against the top of plunger 44 and is secured at its opposite end to a rock shaft 76 that is mounted in suitable bearings on the body 12 of the tool. The forward end of this shaft carries a thumb piece, not shown. When the thumb piece is depressed, the shaft 76 is rocked to shift the arm 75 from the position of Fig. 4 to that of Figs. 2 and 3, and when pressure on the thumb piece is relieved, the springs 45 and 54 tend to return the plunger 44 to its elevated position and thus to swing arm 75 back to the position of Fig. 4.

*Operation.*—The normal position of the control parts is illustrated in Fig. 4 of the drawing, where the inlet port 46 is closed by valve piece 48 engaging the valve seat at the lower end of the port 46, and where the exhaust port 37, 38 is open, the passage 38 being cleared by the plunger 44 so that the passage 40, 39 from cylinder 21 is open to atmosphere. Now when the operator is ready to upset a rivet he causes the plunger 44 to be depressed from the position of Fig. 4 to that of Fig. 2. On account of pellet 57 holding the elements 44 and 49 against movement relatively inward with respect to each other, when the plunger is depressed against the action of spring 45 the stem 49 is depressed to the same extent against the action of spring 54. This carries the passage 56, closed by the enlargement 53, into register with the port 37, 38 thereby blocking off the exhaust port. The same movement unseats inlet valve 48. Air under pressure then flows from the supply through nipple 42 and passage 46 into the cylinder 21 via the passages 40 and 39, forcing the piston 22 to the left and operating the plunger 14. At the start of this operation, the tension of the spring 63 active on the inner flange 62' of the hollow plunger 62 is calculated to overcome the normal pressure of the compressed air admitted from the cylinder 21 into the plunger 62 through the passage 61, which pressure is exerted against the inner face of the closed end of the plunger. As work progresses, the working stroke of the plunger 14 is met with gradually increasing resistance resulting from the increased area of the rivet R subjected to compression, consequently causing the pressure in the cylinder 21 to build up to a predetermined maximum necessary for effecting proper upsetting of the rivet. When the pressure in cylinder 21 has reached its aforesaid maximum, its action on the inner face of the closed end of the hollow plunger 62 will overcome the effect of the spring 63 and leaf spring 58, causing the plunger 62 to slide inwardly and the pellet 57 to slide to the left until its socket 59 is positioned to receive the upper end of the stem 49. In this instance, the stem 49 is free to respond to the action of the spring 54, whereupon it rises to the position of Fig. 3 which closes the inlet valve 48 for preventing further admission of compressed air into the cylinder 21 and causes the enlargement 53 to clear the passage 56, thereby effecting exhaust of the motive fluid from the cylinder 21 through the ports 39, 40, 56, 38 and 37 preparatory to the return stroke of the piston 22 by the spring 21'. By adjustment of the tension of the spring 63 therefore it is possible to control within comparatively fine limits the maximum pressure which may be exerted by the tool, with obvious advantages in the character of the work done.

After the rivet is upset and the control parts have assumed the position of Fig. 3 it is immaterial how long the operator may keep the plunger 44 depressed. The discharge of air from the cylinder 21 of course relieves the pressure on the hollow plunger 62, and the spring 63 returns the plunger to the position of Figs. 2 and 4. The pellet 57, however, can not return to its normal position crosswise of the plunger until the operator relieves his pressure on the plunger 44. Then the spring 45 raises plunger 44 independently of stem 49, thereby carrying pellet 57 to a position above the end of stem 49, whereupon spring 58 slides the pellet to the position of Fig. 4, and the apparatus is ready for the next cycle of operation.

From the foregoing, it will be apparent that the objects of the invention heretofore enumerated and others have been accomplished and that there has been provided a novel and improved control mechanism for limiting the force or pressure exerted by a fluid pressure operated motor and a novel and improved fluid pressure operated tool, such as, a rivet squeezer comprising means for limiting the force or pressure exerted thereby so that the effect of repeated operations of the tool will be uniform. While the preferred embodiment of the invention has been illustrated and described with considerable detail, it is to be understood that the invention is not limited to the particular construction shown and it is our intention to hereby cover all adaptations, modifications and uses thereof which come within the practice of those skilled in the art to which the invention relates and within the spirit and scope of the appended claims.

Having thus described our invention, we claim:

1. In a pneumatic tool including a motor casing having motive fluid supplied thereto for actuating a motor element; a pressure fluid controlling device comprising a valve housing having a chamber, an inlet passage communicating with said chamber and adapted to be connected to a source of pressure fluid, an outlet passage opening into said chamber and casing; means for controlling the flow of pressure fluid from said inlet passage to said outlet passage comprising two relatively movable elements supported in said chamber; means for normally retaining said elements in position to disconnect said outlet passage from said inlet passage; means for normally spacing said elements in predetermined relative position for movement as a unit in a direction to connect said outlet passage with said inlet passage; a member movably supported in said casing; and actuating means for said member responsive to a predetermined pressure of the motive fluid in said casing for moving said member to render said spacer means inoperative to retain said elements in said predetermined relative position.

2. In a pneumatic tool including a motor casing having motive fluid supplied thereto for actuating a motor element; a pressure fluid controlling device comprising a valve housing having a first chamber, a second chamber, a first inlet passage communicating with said first chamber and adapted to be connected to a source of pressure fluid, an outlet passage opening into said first chamber and casing, a second inlet passage leading from said casing to said second chamber; means for controlling the flow of pressure fluid to said outlet passage comprising two relatively movable elements supported in said first chamber; means for normally retaining said elements in position to disconnect said outlet passage from said first inlet passage; means for normally spacing said elements in predetermined relative position for movement as a unit in a direction to connect said outlet passage with said first inlet passage; and a member movably supported in said second chamber and responsive to pressure fluid admitted thereto through said second inlet passage to render said spacer means inoperative to retain said elements in said predetermined relative position.

3. In a pneumatic tool including a motor casing having motive fluid supplied thereto for actuating a motor element; a pressure fluid controlling device comprising a valve housing having a first chamber, a second chamber, an exhaust passage communicating with said first chamber and with atmosphere, an outlet passage opening into said first chamber and casing, a first inlet passage communicating with said first chamber and adapted to be connected to a source of pressure fluid, and a second inlet passage leading from said casing to said second chamber; means for controlling the flow of fluid to and from said outlet passage comprising two relatively movable elements slidably supported in said first chamber; means for normally retaining said elements in position to connect said outlet passage with said exhaust passage and to disconnect said outlet passage with said first inlet passage; means for normally spacing said elements in predetermined relative position for movement as a unit in a direction to disconnect said outlet passage from said exhaust passage and connect said outlet passage with said first inlet passage; and a member movably supported in said second chamber and responsive to pressure fluid admitted thereto through said second inlet passage to render said spacer means inoperative to retain said elements in said predetermined relative position.

4. In a pneumatic tool including a motor casing having motive fluid supplied thereto for actuating a motor element; a pressure fluid controlling device comprising a valve housing having a first chamber, a second chamber, a first inlet passage communicating with said first chamber and adapted to be connected to a source of pressure fluid, an outlet passage communicating with said first chamber, and a second inlet passage communicating with said second chamber; means adapted for connecting said outlet passage with said second inlet passage, means for controlling the flow of pressure fluid to said outlet passage comprising two relatively movable elements slidably supported in said first chamber; means normally retaining said elements in position to disconnect said outlet passage from said first inlet passage; means for normally spacing said elements in predetermined relative position for movement as a unit in a direction to connect said outlet passage with said first inlet passage; and a member movably supported in said second chamber and responsive to pressure fluid admitted thereto through said second inlet passage for shifting said spacer means laterally of the direction of relative motion therebetween to render the same inoperative to retain said elements in said predetermined relative position.

5. In a pneumatic tool including a motor casing having motive fluid supplied thereto for actuating a motor element; a pressure fluid controlling device comprising a valve housing having a first chamber, a second chamber, an outlet passage opening into said first chamber and casing, a first inlet passage communicating with said first chamber and adapted to be connected to a source of pressure fluid, and a second inlet passage leading from said casing to said second chamber; means for controlling the flow of fluid to and from said outlet passage comprising a manually movable member slidably supported in said first chamber, a valve member slidably supported in said first chamber; means for normally retaining said valve member in position to disconnect said outlet passage with said first inlet passage; means for normally spacing said manually movable member and said valve member in predetermined relative position for linear movement as a unit in a direction to connect said outlet passage with said first inlet passage; a piston movably supported in said second chamber and responsive to pressure fluid admitted thereto through said second inlet passage to render said spacer means inoperative to retain said members in said predetermined relative position; and adjustable resilient means for resisting said movement of said piston.

6. In a pneumatic tool including a motor casing having motive fluid supplied thereto for actuating a motor element; a pressure fluid controlling device comprising a valve housing having a first chamber, a second chamber, an exhaust passage communicating with said first chamber and with atmosphere, an outlet passage communicating with said first chamber and casing, a first inlet passage communicating with said first chamber and adapted to be connected to a source of pressure fluid, and a second inlet passage leading from said casing to said second chamber; means for controlling the flow of fluid to and from said outlet passage comprising a manually operable member slidably supported in said first chamber, a valve member slidably supported in said first chamber; resilient means for normally retaining said valve member in position to connect said outlet passage with said exhaust passage and to disconnect said outlet passage with said inlet passage; a spacer member slidably supported in said manually operable means for normally maintaining said manually operable member and said valve member in predetermined relative position for linear movement as a unit in a direction to disconnect said outlet passage from said exhaust passage and connect said outlet passage with said first inlet passage; a piston movably supported in said second chamber to one side of said second inlet passage; means for operatively connecting said spacer member and said piston whereby movement of said piston in response to pressure fluid admitted to said second chamber through said second inlet passage moves said spacer means to a position where it is inoperative to retain said members in said predetermined relative position; and adjustable resilient means for resisting said movement of said piston.

7. In a pneumatic tool including a motor casing having motive fluid supplied thereto for actuating a motor element; a pressure fluid controlling device comprising a valve housing having a first chamber, a second chamber, an outlet passage constantly opened in said first chamber, a first inlet passage communicating with said first chamber and adapted to be connected to a source of motive fluid, and a second inlet passage communicating with said outlet passage and said second chamber; valve means for opening or closing said first inlet passage comprising two relatively movable elements supported in said first chamber; means for normally retaining said elements in position to close said first inlet passage; means for normally spacing said elements in predetermined relative position for movement as a unit in a direction to open said first inlet passage; a member movably supported in said second chamber, and means responsive to the attainment of a predetermined pressure of fluid admitted into said second chamber through said second inlet passage for moving said member to render said spacer means inoperative to retain said elements in said predetermined position.

PAUL VAN SITTERT.
LLOYD G. SPETH.

REFERENCES CITED

The following references are of record in the file of this patent:

UNITED STATES PATENTS

| Number | Name | Date |
|---|---|---|
| 1,768,275 | Urton | June 24, 1930 |
| 1,855,348 | Hamilton | Apr. 26, 1932 |
| 1,890,847 | Flory | Dec. 13, 1932 |
| 2,246,379 | Muir | June 17, 1941 |
| 2,313,843 | Shaff | Mar. 16, 1943 |